United States Patent
Richter et al.

(10) Patent No.: US 9,195,534 B2
(45) Date of Patent: Nov. 24, 2015

(54) METHOD FOR STORING AND PROPAGATING ERROR INFORMATION IN COMPUTER PROGRAMS

(71) Applicant: Siemens Aktiengesellschaft, Munich (DE)

(72) Inventors: Jan Richter, Lauf a. d. Pegnitz (DE); Andreas Schenk, Erlangen (DE); Karl-Hermann Witte, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 268 days.

(21) Appl. No.: 13/772,909

(22) Filed: Feb. 21, 2013

(65) Prior Publication Data
US 2013/0219231 A1   Aug. 22, 2013

(30) Foreign Application Priority Data
Feb. 22, 2012 (EP) .................................... 12156426

(51) Int. Cl.
*G06F 11/07* (2006.01)
*G06F 11/00* (2006.01)
*G06F 11/08* (2006.01)

(52) U.S. Cl.
CPC .......... *G06F 11/0778* (2013.01); *G06F 11/006* (2013.01); *G06F 11/0763* (2013.01); *G06F 11/085* (2013.01)

(58) Field of Classification Search
CPC .................................................. G06F 11/1412
See application file for complete search history.

(56) References Cited

U.S. PATENT DOCUMENTS

| | | | |
|---|---|---|---|
| 7,793,201 B1* | 9/2010 | Ulriksson | 714/794 |
| 2011/0041013 A1 | 2/2011 | Ingimundarson | |
| 2013/0246878 A1* | 9/2013 | Pancholi et al. | 714/752 |
| 2013/0262938 A1* | 10/2013 | Schmitt et al. | 714/48 |

FOREIGN PATENT DOCUMENTS

| | | |
|---|---|---|
| CN | 1652611 | 8/2005 |
| CN | 101030164 | 9/2007 |
| CN | 101276627 | 10/2008 |
| CN | 102289408 | 12/2011 |

(Continued)

OTHER PUBLICATIONS

Microsoft Computer Dictionary, 4th Ed., Microsoft Press, 1999, p. 173.*

(Continued)

*Primary Examiner* — Christopher McCarthy
(74) *Attorney, Agent, or Firm* — Coze O'Connor

(57) ABSTRACT

A method for storing and propagating error information in computer programs, in which a globally valid error variable is used for storing and propagating the error information, wherein for each recognized error a nonzero value for the error is added to the error variable as error information with a respective stipulated arithmetic sign, and wherein the value is formed from a discrepancy in the content of a coded variable from an expected value. This combination and integration of a separate global propagation variable with values derived from an error, particularly by virtue of detected discrepancies in the known error recognition and propagation paths using operations and operands in "coded processing", achieves an increased propagation certainty.

12 Claims, 1 Drawing Sheet

(56) References Cited

FOREIGN PATENT DOCUMENTS

| | | |
|---|---|---|
| DE | 102009037630 A1 | 2/2011 |
| EP | 1892639 A2 | 2/2008 |

OTHER PUBLICATIONS

Wappler et al. "Software Encoded Processing: Building Dependable Systems with Commodity Hardware", Conference: Computer Safety, Reliability, and Security, 26$^{th}$ International Conference, SAFECOMP 2007, Nuremburg, Germany, Sep. 18-21, 2007, pp. 356-359.

Nicolescu et al. "Software Detection Mechanisms Providing Full Coverage Against Single Bit-Flip Faults", IEEE Transactions on Nuclear Science, vol. 51, No. 6, Dec. 31, 2004, pp. 3510-3518.

Fetzer et al. "AN-Encoding Compiler: Building Safety-Critical Systems with Commodity Hardware", SAFECOMP 2009, LNCS 5775, Sep. 30, 2009, pp. 283-296.

Qing-he et al. "Study and Analysis on Error Propagation in Onboard Software System", Computer Engineering, vol. 37, No. 15, Aug. 31, 2011, pp. 14-16 and 22.

Ai-Guo et al. "An Approach for Identifying Software Vulnerabilities Based on Error Propagation Analysis", Chinese Journal of Computers, vol. 30, No. 11, Nov. 30, 2007, pp. 1910-1921.

Aiguo et al. "Error Propagation Analysis in Software", Journal of Computer Research and Development, Dec. 31, 2007, pp. 1962-1970.

Mahmood et al. "Concurrent Error Detection Using Watchdog Processors—A Survey", IEEE Transactions on Computers, vol. 37, No. 2, Feb. 1, 1988, pp. 160-174.

\* cited by examiner

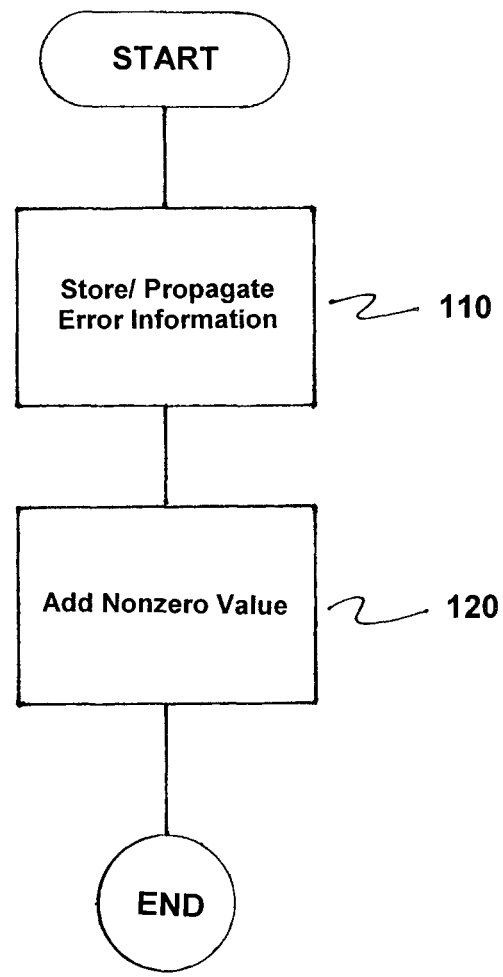

METHOD FOR STORING AND PROPAGATING ERROR INFORMATION IN COMPUTER PROGRAMS

BACKGROUND OF THE INVENTION

1. Field of the Invention

The invention relates to a method for storing and propagating error information in computer programs.

2. Description of the Related Art

In safety-oriented programs for industrial applications, that are typically executed on embedded hardware, such as programmable logic controllers (PLCs) including a processor or other type of computational unit, it is necessary to ensure that the error information spotted during program execution is safely retained up to the end of the program run or up to the end of a cycle so that the routines for error reactions that are executed at the end of the program run or cycle are initiated with certainty. The storage and retention of the error information up to the end of the program is referred to generally as error propagation.

Important variables are processed in coded form in the safety-oriented programs, where this process is also called "coded processing". To this end, values (xf) are coded in variables via AN, ANB (AN+B), ANBD codes or by related codes (hybrid method). In this case, all numerical variables are coded on the basis of a rule in the form $$x_c = A*xf + B\_x + D, \qquad \text{Eq. (1)}$$

and the arithmetic operations (+, −, *, /, etc.) are customized such that the processing in the coded range (xc) delivers consistent results for the Ur range (xf) (in this case, it is entirely possible for B_x or D also to have the value zero).

The coded variable can be used to detect errors arise as a result of a random change or corruption of individual bits, for example. This means that the values to be coded are mapped onto coded values such that a discrepancy in individual bits can be recognized by virtue of errors in individual bits allowing the production of invalid values in the coded space, for example, on account of the Hamming distance between admissible coded values. Here, it is also possible for double storage and processing of the values, i.e., once in coded form and once in uncoded form, to occur, with the respective verification involving the value being extracted from the coded variable and being compared with the value managed in uncoded form.

A program run is verified in the conventional systems by using run variables, known as "tracers", the content of which can be used to log and hence check the program path taken.

Thus, while numerous known approaches exist for the recognition of errors, the failsafe formation of an error variable and the propagation thereof are not trivial. By way of example, there is no possibility of adding a constant to an error variable, etc., for every error or alternatively in every case of nonerror because such standard steps can be optimized, i.e., combined, for example, by compilers, which reduces the certainty.

SUMMARY OF THE INVENTION

It is therefore an object of the present invention to provide a method for failsafe propagation of errors in computer programs.

This and other objects and advantages are achieved in accordance with the invention by a method for storing and propagating error information in computer programs, in which a globally valid error variable is used for storing and propagating the error information, where for each recognized error a nonzero value for the error is added to the error variable as error information with a respective stipulated arithmetic sign, and where the value is formed from a discrepancy in the content of a coded variable from an expected value. This combination and integration of a separate global propagation variable with values derived from an error, particularly by virtue of detected discrepancies in the known error recognition and propagation paths using operations and operands in "coded processing", achieves increased propagation certainty.

It is an essential concept of the way in which the invention achieves the object that a container used for the error propagation is an error variable, the content of which is formed such that corruption can be recognized and that the effect of different independent errors cannot result in reciprocal compensation. The invention achieves this by virtue of the error information with a stipulated arithmetic sign being propagated in the error variable. A further protection, particularly against systematic errors and against untransparent and unwanted optimizations in a compiler, etc., is achieved by virtue of the invention deriving the value that enters the propagation variable from the error, i.e., the absolute value discrepancy from a target condition.

Errors become easily recognizable, for example, in the case of the "random" corruption of variables, when the coded variable is coded by AN or AN+B or ANBD coding or by a hybrid form comprising these codings.

Besides the propagation of errors in variables and values, the method can advantageously also be used for verifying a program run or the like by virtue of the error variable being divided into at least an upper bit range and a lower bit range, where the value is summed in the lower bit range each time, and where a check value is summed in the upper bit range. In this case, advantageously the check value used is the expected value or the check value is at least formed from the expected value.

Further protection against systematic errors is obtained particularly for failsafe programs in industrial automation engineering when the computer program comprises at least one cyclically executed procedure, where the error variable is initialized with a starting value at the beginning of a cycle, and where different starting values are used for different cycles. In this case, the aim in one advantageous embodiment is for the stipulated arithmetic sign not to be changed at least for the duration of one cycle.

The error variable is evaluated and hence an error event is recognized by advantageously comparing the content of the error variable with an expected value for the content of the error variable.

Fast and arithmetically simple processing is obtained when the value is formed by logically combining the discrepancy in the content of the coded variable with the expected value via an XOR function.

The method can advantageously be used to verify a program run by virtue of a signature being calculated and being added to the coded variable or being subtracted therefrom each time at least in an essential program portion when the essential program portion is executed, and by virtue of an expected value for the signature as intended for a proper program run being subtracted from the coded variable or added thereto, with the calculated signature and the expected value canceling one another out in the error-free case. Alternatively, the error can be propagated by using the addition (subtraction) of the calculated signature, and the expected value for the signature can be subtracted (added) also by using the error variable (propagation variable).

It is also possible for simple errors recognized in the program itself to be propagated using the method by virtue of such errors being propagated by adding a constant, for example, and nonzero value to the error variable or subtracting it therefrom each time.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

An exemplary embodiment of the method according to the invention will be explained below; the variants discussed in this context can also be implemented in combination with one another.

The FIGURE is a flowchart of the method in according with the invention.

DETAILED DESCRIPTION OF THE PREFERRED EMBODIMENTS

A propagation variable is intended to be considered as a coded variable P which is initialized in a suitable manner at the beginning of a program run and which is used to hold the results of consistency checks on a coded useful variable $x_c$ during the program execution:

$$x_c = A * xf + B\_x + D \qquad \text{Eq. (1)}$$

In this case, A, B_x and D are constants at least for one program cycle. For A, a high prime number is advantageously used, because this allows the use of the modulo operation for recognizing errors.

An error is thus present in recognizable form (in simplified terms) when the content of the variable $x_c$ is discernibly different from the form (1), i.e., when the following applies:

$$X_F = (x_c - D) \text{ modulo } A \neq B\_x$$

Without loss of generality, $x_F \geq 0$ applies (e.g., as a result of the use of the relevant modulo command from the arithmetic and logic unit).

In this case, B_x is the expected value, i.e., the value of the modulo operation in the error-free case. Discrepancies from B_x can therefore be considered to be errors.

In a program run or in a cycle of a program, the error is then frequently present both in positive and negative form and in many ways in alienated form. The mere addition (alternatively: mere subtraction) of the error-containing values could therefore often result in loss of the recognizability of errors. The method prevents this loss by stipulating in advance the direction (positive or negative) in which and with how many bits an error is permitted to have an effect.

The first value for the recognizability is a random value $x_F$ between 0 and A. $x_F - B\_x$ may therefore be either positive or negative. Since only the recognizability of an error is of interest, however, the XOR function is simply used instead of the subtraction:

xF=B_x: xF XOR B_x=0 applies (error-free case)
xF≠B_x: xF XOR B_x>0 applies (since xF≥0 and B_x>0) and
xF XOR B_x<$2^n$ applies when A<$2^n$ If an error is now propagated both in its positive form and in its negative form, two positive values are added. The sum of two positive values is always not equal to zero. A compensation can therefore be provided only by an overflow in the numerical ring of the arithmetic and logic unit. There should therefore be sufficient upper bits available.

The results of such consistency checks using the described "modulo" operation are in this case meant to be transferred at regular check points (e.g., after every coded operation) such that unintentional compensation for error information that is already present is avoided. This is achieved by the described additive (alternative: subtractive) cumulation of error information with a positive arithmetic sign.

The following describes an example of the propagation in a 32-bit value P with the use of 16-bit signatures:

$$x_F = (x_c - D) \text{ mod } A \qquad \text{Eq. (2)}$$

The expected value for $x_F$ is $B_x$. The error information corresponds to the difference between $x_F$ and $B_x$.

$$x_P = (x_F \ \& \ 2^{16} - 1) \text{ XOR } (B_x \cdot (2^{16} + 1)) \qquad \text{Eq. (3)}$$

In this case, the later addition (alternatively: subtraction) involves the value $B_x$ being shifted to the upper 16 bits as a check value; this can be used to verify the program run, for example, by verifying whether the number of check processes corresponds to an expected value.

In principle, it is necessary to ensure that the error information (the difference between the expected value for $x_F$ and $x_F$) always enters the propagation in positive form (or alternatively always in negative form) so that compensation effects are precluded.

Coding rule (1) means that the following applies in the error-free case:

$$x_P = B_x \cdot 2^{16} \qquad \text{Eq. (4)}$$

For every operation, the error information (3) is formed and is added to the propagation variable P, with the result that $$P = \sum_{i=1}^{OpNumber} x_{P,i} \qquad \text{Eq. (5)}$$

At the end of the program cycle, the propagation variable $P_{end}$ must correspond to a value Pe that is to be expected:

$$P_{end} = P_e \qquad \text{Eq. (4)}$$

The value to be expected can be ascertained by an encoder or compiler at the translation time and can therefore be checked in a final consistency check in the form (6). Hence, an additional propagation path over the already known propagation path to the coded output values is created. Furthermore, this mechanism reveals missing updates for the propagation variable P, as a result of which it is possible to implement program run verification.

In one advantageous embodiment of the invention, error information $x_F$ is propagated not upon every operation but rather only before operations that necessitate an increase propagation loss risk (such as multiplication, division). Chains of propagation-safe operations, such as addition, have sufficiently good propagation properties for most purposes, which means that it is possible to dispense with steps (3) and (5) until a propagation-critical operation is effected. This form results in improved performance in comparison with update of the propagation variable upon every operation.

The propagation can advantageously be constantly corrected in the case of alternative procedures in a path. To this end, the difference in the expected values for the propagation variable at the end of the alternative path is added to the propagation variable.

In one embodiment of the invention, the propagation variable is initialized dynamically at the beginning of each cycle, e.g. by virtue of initialization with the dynamic signature D.

In a further embodiment of the invention, the arithmetic sign of the error information $x_P$ is altered dynamically. The arithmetic sign can be altered only when the cycle changes (i.e., may be the same within each cycle), or alternatively can also be altered within a cycle, the latter case requiring precautions to be taken to ensure that unwanted compensation cannot occur, for example, as a result of interim evaluation of the propagation variable P as per Eq. (6).

In advantageous embodiment, methods for error recognition can be combined with the previously described embodiments of the method for error propagation. In this regard, one advantageous embodiment allows the propagation of a calculated signature S in a suitable coded variable $x_c$, with an explicit expected value Se existing for S:

$$x_c = x_c - S_e + S$$

The presently contemplated embodiment can be used particularly advantageously for the program run protection, for example, by virtue of the signature S used being a program run variable ("tracer") which, in the case of correct execution, is always assigned an explicit value for each basic block of a program. Combining the program run variable with the method for error propagation increases the effectiveness of the program run protection and simultaneously improves the system independence (compiler, operation system, hardware).

Alternatively, it is possible for the calculated signature S or the program run variable to be propagated directly by means of the propagation variable P, with an explicit expected value $S_e$ existing for S:

$$P = P + ((S \bmod A) \text{ XOR } ((S_e \bmod A)*(2^{16}-1))$$

Note: if the numerical range of S is greater than the desired numerical range for propagation, the numerical range can easily be reduced in size, e.g. as follows:

$$S' = (S \text{ XOR } X/2^{16}) \text{ AND } (2^{16}-1)$$

Finally, it is also possible for the propagation variable P to be influenced directly in order to "report" an error:

IF (error)
THEN $$P = P + 1$$

Instead of the addition, subtraction is then used for "negative error logic". Instead of the constant "1", it is also possible to add or subtract other values which then advantageously change a plurality of bits of the propagation variable.

The Figure is a flowchart of a computer implemented method for storing and propagating error information in computer programs. The method comprises storing and propagating the error information via a globally valid error variable, as indicated in step 110. Next, for each recognized error, a nonzero value for an error is added by the processor of the computer to the error variable as the error information with a respective stipulated arithmetic sign, as indicated in step 120. Here, the nonzero value is formed from a discrepancy in a content of a coded variable from an expected value.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those method steps which perform substantially the same function in substantially the same way to achieve the same results are within the scope of the invention. Moreover, it should be recognized that method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A computer implemented method for storing and propagating error information in computer programs, the method comprising the steps of:

storing and propagating the error information via a globally valid error variable; and adding, in a processor of the computer, for each recognized error, a nonzero value for an error to the error variable as the error information with a respective stipulated arithmetic sign, the nonzero value being formed from a discrepancy in a content of a coded variable from an expected value.

2. The method as claimed in claim 1, wherein the coded variable is coded via at least one of AN coding, AN+B coding, ANBD coding and a hybrid form comprising these codings.

3. The method as claimed in claim 1, wherein the error variable is divided into at least an upper bit range and a lower bit range, wherein the expected value is summed in the lower bit range at each cycle; and wherein a check value is summed in the upper bit range.

4. The method as claimed in claim 3, wherein the check value used is one of the expected value and at least formed from the expected value.

5. The method as claimed in claim 1, wherein the computer program comprises at least one cyclically executed procedure;

wherein the error variable is initialized with a starting value at a beginning of a cycle; and wherein different starting values are used for different cycles.

6. The method as claimed in claim 5, wherein a stipulated arithmetic sign is unchanged at least for a duration of one cycle.

7. The method as claimed in claim 1, wherein the computer program used is an automation program for a failsafe automation component in an industrial automation arrangement.

8. The method as claimed in claim 1, further comprising:

comparing a content of the error variable with an expected value for the content of the error variable to recognize an error event.

9. The method as claimed in claim 1, wherein the value is formed by logically combining the discrepancy in the content of the coded variable with the expected value via an XOR function.

10. The method as claimed in claim 1, wherein a program run is verified by calculating a signature and one of adding the calculated signature to the coded variable and subtracting the calculated signature from the coded variable each time at least in an essential program portion when the essential program portion is executed; and wherein an expected value for a signature as intended for a proper program run is one of subtracted from the coded variable and added to the coded variable, with the calculated signature and the expected value canceling one another out in an error-free case.

11. The method as claimed in claim 1, wherein a program run is verified by calculating a signature and one of adding the calculated signature to the error variable and subtracting the calculated signature from the error variable each time at least in an essential program portion when the essential program portion is executed, and wherein an expected value for the signature as intended for a proper program run is one of subtracted from the error variable and added to the error variable, with the calculated signature and the expected value canceling one another out in the error-free case.

12. The method as claimed in claim 1, wherein an error is propagated by one of adding a constant value to the error variable and subtracting the constant value from the error variable.

* * * * *